United States Patent [19]

Kelley

[11] Patent Number: 5,030,694

[45] Date of Patent: Jul. 9, 1991

[54] HIGH IMPACT THERMOPLASTIC POLYMER COMPOSITIONS

[76] Inventor: Joseph M. Kelley, 1321 E. Broad St., Westfield, N.J. 07090

[21] Appl. No.: 440,308

[22] Filed: Nov. 22, 1989

[51] Int. Cl.$^5$ .................. C08L 23/26; C08L 23/16
[52] U.S. Cl. ................................ 525/194; 525/211; 525/240
[58] Field of Search .................... 525/240, 194

[56] References Cited

U.S. PATENT DOCUMENTS

| | | | |
|---|---|---|---|
| 3,144,436 | 8/1964 | Greene et al. | 260/93.7 |
| 3,923,947 | 12/1975 | Cook | 264/141 |
| 3,970,719 | 8/1976 | Edmonds, Jr. | 260/878 |
| 4,039,632 | 8/1977 | Edmonds, Jr. | |
| 4,061,694 | 12/1977 | Castagna | 260/878 |
| 4,087,485 | 5/1978 | Huff | 260/897 |
| 4,088,714 | 5/1978 | Huff | 260/897 |
| 4,221,882 | 9/1980 | Huff | 525/240 |
| 4,375,531 | 3/1983 | Ross | 525/93 |
| 4,454,092 | 6/1984 | Shimizu et al. | 525/240 |
| 4,634,740 | 1/1987 | Fujita et al. | 525/240 |
| 4,748,206 | 5/1988 | Nagiwa et al. | 525/240 |

FOREIGN PATENT DOCUMENTS

| | | |
|---|---|---|
| 8510222 | 2/1985 | China . |
| 85/776 | 2/1985 | Czechoslovakia . |
| 72203 | 2/1983 | European Pat. Off. . |
| 269265 | 6/1988 | European Pat. Off. . |
| 2620820 | 11/1976 | Fed. Rep. of Germany . |
| 3520106 | 6/1985 | Fed. Rep. of Germany . |
| 3520151 | 6/1985 | Fed. Rep. of Germany . |
| 50-112729 | 9/1975 | Japan . |
| 51-58990 | 5/1976 | Japan . |
| 51-121250 | 10/1976 | Japan . |
| 52-60399 | 5/1977 | Japan . |
| 52-66328 | 6/1977 | Japan . |
| 52-108117 | 9/1977 | Japan . |
| 54-76936 | 6/1979 | Japan . |
| 54-169395 | 12/1979 | Japan . |
| 55-96456 | 7/1980 | Japan . |
| 55-141346 | 10/1980 | Japan . |
| 56-102103 | 6/1981 | Japan . |
| 58-122947 | 8/1981 | Japan . |
| 56-1758 | 1/1982 | Japan . |
| 57-1759 | 1/1982 | Japan . |
| 57-27837 | 2/1982 | Japan . |
| 61-149643 | 6/1986 | Japan . |
| 764991 | 11/1976 | Netherlands . |
| 3612643 | 3/1983 | U.S.S.R. . |

OTHER PUBLICATIONS

Chemical Abstract 109(6):38790q.
Chemical Abstracts 106(10):68523k.
Chemical Abstracts 102(20):168136x.
Chemical Abstracts 100(10):69685c.
Chemical Abstracts 99(14):106639z.
Chemical Abstracts 98(26):216979x.
Chemical Abstracts 97(22):183779f.
Chemical Abstracts 95(14):116825p.

Primary Examiner—Carman J. Seccuro

[57] ABSTRACT

Described is a high melt flow rate, high impact thermoplastic polymeric composition comprising the reaction product of a polymerized ethylene propylene diene monomer (EPDM) and an ethylene propylene copolymer and an effective amount of organic peroxide wherein the amount of EPDM ranges from about 2 to about 10% by weight of the composition and the ethylene propylene copolymer ranges from about 90 to about 98% by weight, wherein the reaction product can be characterized as having a no break condition according to the IZOD impact test.

26 Claims, No Drawings

HIGH IMPACT THERMOPLASTIC POLYMER COMPOSITIONS

TECHNICAL FIELD

The present case is concerned with high impact thermoplastic polymeric compositions. In particular, it is concerned with ethylene propylene diene elastomeric materials and ethylene propylene copolymers.

BACKGROUND OF THE INVENTION

U.S. Pat. No. 4,375,531 relates to a high melt flow rate, high impact, visbroken polymeric composition comprising block copolymers of polypropylene and ethylene and a second component such as a low density polyethylene. High amounts of expensive polypropylene is suggested for use in the composition.

U.S. Pat. No. 3,970,719 teaches the preparation of block polymers of olefinic materials utilizing titanium trihalides or trialkyl aluminum materials. Block copolymers of ethylene and propylene are described utilizing the aforementioned catalysts.

U.S. Pat. No. 4,088,714 relates to cross-linked melt flowable thermoplastic elastomer blend. The monoolefin polymer, the elastomer or rubber cross-linkable, low density polyethylene resin and polypropylene resin are mixed with a curing agent for the rubber and the low density polyethylene components and subjected to curing conditions. The curing takes place at sufficiently elevated temperatures for a sufficient period of time with continuous mixing to tightly, fully cure the rubber and low density polyethylene components to form an essentially non-melt flowable discontinuous elastomer phase disbursed throughout the continuous phase of polypropylene.

It is an object of the present invention to obtain a reaction product of a polymerized ethylene propylene diene monomer (EPDM) and an ethylene propylene copolymer and an organic peroxide where the reaction product will have a substantial impact resistance such as to meet or exceed the IZOD no-break impact testing.

SUMMARY OF THE INVENTION

Described is a high impact thermoplastic polymeric composition comprising the reaction product of a polymerized ethylene propylene diene monomer (EPDM) and an ethylene propylene copolymer and an organic peroxide capable of generating free radicals at operating reaction conditions, e.g. at least 175° Centigrade, wherein the EPDM material is present in an amount of about 2% to about 10% by weight of the total composition and wherein the ethylene propylene copolymer is present in an amount from 90 to 98% by weight of the composition and wherein the peroxide is present in an effective cross-linkable amount.

DESCRIPTION OF THE PREFERRED EMBODIMENTS

The high impact thermoplastic polymeric compositions of the present invention are obtained by reacting a polymerized ethylene propylene diene monomer (EPDM) and a ethylene propylene copolymer and an organic peroxide at elevated temperatures generally in excess of approximately 175° Centigrade.

It is important to have the reactants substantially thoroughly mixed in intimate admixture to insure sufficient cross-linking of the reactants across the ethylenic unsaturated moieties of the reactants. Generally, the mixing takes place in an extruder having multiple heating zones. A preferred extruder is a ZSK twin screw extruder having 7 zones. The extruder screw can be run at varying revolutions per minute (rpm), such as 100 to 400 rpm, preferably 200 to 350 rpm; at a temperature profile of from 100° to 175° Centigrade for zones 3 and 4, 180° to 220° Centigrade for zones 5 and 6, approximately 200° to 225° Centigrade for zone 7, and 200° to 210° Centigrade for zone 8; and at a die temperature of approximately 185° to 225° Centigrade, preferably 210° Centigrade. A variety of commercially available twin screw extruders can perform in a similar function.

The EPDM material that may be used in the present invention is commercially available material. A preferred material is available under the name EPsyn 2308 (Trademark of Copolymer Rubber & Chemical Corporation of Baton Rouge, La.). The polymer characteristics for EPsyn 2308 are a Mooney viscosity of 24 (ML 1+4 at 125° Centigrade), an ethylene content of 74 weight percent and an ethylidiene norbornene content of 2.2 weight percent. The amount of EPDM material that is employed ranges from about 2 to 10% by weight of the total composition, preferably about 3-5%. Other dienes that may be used include 1,6-hexadiene, cyclopentadiene and the like.

The ethylene propylene copolymer is commercially available from a number of sources. One copolymer is available as Mitsui B240 (Trademark of Mitsui Corporation of Tokyo, Japan). The copolymer of ethylene propylene generally has a very low melt flow having a range of 0.2-2. Most commercially available copolymers having a low melt flow, an appreciable ethylene propylene rubber content and high percent ethylene content are suitable feedstock for this process. The amount of ethylene propylene copolymer that is used ranges from about 90 to about 98% by weight of the total composition, preferably 95 to about 97% by weight.

The organic peroxide which is used in the present invention is one that will generate an effective amount of free radicals that will promote the cross-linking of ethylenically unsaturated moieties present in either of the reactants. The cross-linking also occurs by virtue of the radicals generated from the peroxide attacking the hydrogens on the tertiary carbons of the ethylene propylene copolymers or the EPDM materials and then subsequently combining. Other free radical reactions which occur are chain scission in the ethylene propylene copolymer chain. This results in a lowering of the average molecular weight of the polymer and gives a higher melt flow at higher temperatures.

While Applicant does not wish to be held to any particular theory, it is believed that there is some cross-linking of the reactants that occurs. This cross-linking causes the impact strength of the polymer to increase markedly. As a matter of fact, adding only about 4–5% EPDM to the composition and extruding the low melt flow copolymer base in the presence of an effective amount of the peroxide, yields a composition which has a relatively low molecular weight (melt flow of 10, condition L) and a relatively high flexural stiffness. It shows no break in a room temperature IZOD impact test. This balance of properties, namely high stiffness and no break IZOD, has not been observed unless large amounts of expensive rubbery material are blended with the high melt flow rate polypropylene or copolymer thereof.

The amount of the peroxide material that may be used can vary widely ranging from 100 ppm to 0.5% by weight of the total composition, preferably 300 ppm to about 0.2%.

The resulting composition of the present invention can be characterized as having a high melt flow according to ASTM 1238-79, condition L i.e., greater than 5 and up to 12. Due to the high impact strength, according to the IZOD test, the thermoplastic compositions are readily moldable. Uses of the final molded composition are automotive trim, automotive bumpers or facia, and the like.

The peroxide materials that can be used in the present invention are of a wide variety. The preferred peroxide is Lupersol or Luperox 101 (Trademark of Luperox GmbH of W. Germany for 2,5-dimethyl-2,5-di(t-butylperoxy)hexane. Other peroxides that can be used are dicumyl peroxide; t-butyl cumyl peroxide; α α'-bis (t-butyl peroxy) diisopropyl-benzene; di-t-butyl peroxide; 2,5-dimethyl-2,5-di(t-butyl peroxy)-hexyne-3, and the like.

Outlined below are examples relating to the preferred embodiments of the present invention wherein all temperatures are in degrees Centigrade and percentages are percentages by weight, unless otherwise indicated.

EXAMPLES 1-4

A propylene/ethylene copolymer powder having a nominal 0.5 melt flow (condition L), an ethylene content of 16 weight percent, and an IZOD impact strength of 7.4 was mixed with a polymerized ethylene propylene diene monomer rubber from Copolymer Corporation identified as DE208 (the pelletized version of 2308 bale rubber) see page 3, lines 17-23 for a description of the 2308 rubber. The peroxide used was 2,5-dimethyl-2,5-di(t-butylperoxy) hexane.

The blends were prepared using the concentrations specified in Table I below. All of the ingredients were weighed and pre-blended. In the case of liquid ingredients, such as peroxide, the materials were first dispersed on polypropylene/ethylene or were supplied from the manufacture already dispersed on polypropylene/ethylene powder.

These materials were dry-blended together with a sufficient amount of stabilizer master batch to give about 1000 ppm peroxide, 1000 ppm antioxidant and 600 ppm calcium stearate in the finished blends. These blends were then extruded in a ZSK 30 millimeter twin screw extruder having 7 zones into a strand die and water bath. The screw was run at 331 rpm giving 60 pounds/hour output of product at a temperature profile of 141° Centigrade for zones 3 and 4, 211° Centigrade for 5 and 6, 220° Centigrade for zone 7, 207° Centigrade for zone 8 and a die temperature of 209° C. After the formulations were extruded into pellets, they were tested for physical properties by standard ASTM tests with the test results reported below:

TABLE I

| ETHYLENE-PROPYLENE-EPDM-PEROXIDE REACTIVE PROCESSING | | | | |
|---|---|---|---|---|
| EXAMPLE | 1 | 2 | 3 | 4 |
| ETHYLENE/PROPYLENE (Copolymer) wt. % | 97 | 95 | 95 | 90 |
| EPSYN 208 wt. %, (pelletized form of EPSYN 2308) | 3.0 | 5 | 5 | 10 |
| PEROXIDE, PPM | 1070 | 930 | 1070 | 930 |

TABLE I-continued

| ETHYLENE-PROPYLENE-EPDM-PEROXIDE REACTIVE PROCESSING | | | | |
|---|---|---|---|---|
| EXAMPLE | 1 | 2 | 3 | 4 |
| LUPEROX 101 MELT FLOW RATE (ASTM D1238-86 Cond. L) | 11.0 | 7.3 | 11.8 | 8.6 |
| FLEXURAL MODULUS $\times 10^3$, psi (ASTM D790) | 138 | 135 | 129 | 116 |
| IZOD IMPACT ft.-lbs./in. (ASTM D256-84) | 8.8 P.B.** | N.B.* | N.B.* | N.B.* |

*N.B. - no break
**P.B. - partial break

Adding as little as 3% rubber to this formulation caused the impact strength of the formulation to increase to 8.8 ft.-lbs./in. at a melt flow of 11.0. Additionally, if 5% DE208 rubber was added to the formulation instead of 3% rubber, the high melt flow of the polymer was maintained and the polymer did not break at 23° C. when tested in the IZOD impact test.

Thus, in this invention, 3-4% of a low Mooney viscosity rubber is used to prepare a high melt flow, super impact ethylene/propylene formulation in the presence of peroxide. It is believed that substantially less of expensive rubber is required in the presence perioxide to prepare a super high impact, high melt flow ethylene-propylene thermoplastic composition.

It is also to be appreciated that the invention can have included therein fillers, stabilizers, antioxidants, processing aids, colorants and other known additives if desired in conventional amounts. The use of such additives and their effects on thermoplastic elastomer blends are well known and need not be described further. A preferred antioxidant is Irganox 1010 (Trademark of CIBA-Geigy of New Jersey) for tetrakis [methylene (3,5-di-tert-butyl-4-hydroxy) hydrocinnamate] methane.

While the forms of the invention herein disclosed constitute presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention.

What is claimed is:

1. A high melt flow, high impact strength thermoplastic polymeric composition comprising the reaction product of (a) about 2 to about 10% by weight of a polymerized ethylene-propylene-diene monomer (EPDM) having a Mooney viscosity (ML 1-1+4 at 125° C.) of about 20 to about 40 (b) about 90 to about 98% by weight of an ethylene-propylene copolymer having a low melt flow rate and an Izod impact strength of about 9 ft. -lbs/in or less, and (c) an effective amount of an organic peroxide and wherein the reaction product has a no break Izod impact strength.

2. The composition of claim 1, wherein the polymerized EPDM is present in an amount greater than about 3% by weight.

3. The composition of claim 2, wherein the reaction product is about 5 to about 10% by weight of EPDM and about 90 to about 95% by weight of the ethylene-propylene copolymer.

4. The composition of claim 1, wherein the amount of the peroxide is about 930 to about 1070 ppm.

5. The composition of claim 4, wherein the EPDM has an ethylene content of about 70 to about 75% by weight.

6. The composition of claim 1, wherein the ethylene-propylene copolymer has a melt flow rate (Condition L) of about 0.1 to about 2 and an Izod impact strength of about 5 to about 9 ft.-lbs./in.

7. The composition of claim 6, wherein the ethylene-propylene copolymer has a melt flow rate (Condition L) of 0.5, an Izod impact strength of about 7 to about 8 ft.-lbs./in., and ethylene content of about 16% by weight.

8. The composition of claim 1, wherein the diene in the EPDM is selected from the group consisting of ethylidene norbornene, 1,6 hexadiene, and cyclopentadiene.

9. The composition of claim 1, wherein the reaction product is about 5 to about 10% by weight of EPDM and about 90 to about 95% by weight of the ethylene-propylene copolymer, wherein the polymerized EPDM has an ethylene content of about 70 to about 75%, and wherein the ethylene-propylene copolymer has a melt flow rate (Condition L) of about 0.5 about an Izod impact strength of about 7 to about 8 ft.-lbs./in.

10. The composition of claim 9, wherein the diene in the polymerized EPDM is ethylidene norbornene and wherein the ethylene content of the ethylene-propylene copolymer is about 16% by weight.

11. The composition of claim 10, wherein the ethylidene norbornene is present in an amount of about 2 to about 3%.

12. The composition of claim 4, wherein the amount of polymerized EPDM is greater than 3% by weight.

13. A high melt flow, high impact strength thermoplastic polymeric composition comprising the reaction product of (a) a polymerized ethylene-propylene diene monomer (EPDM) having a Mooney viscosity (ML 1-1+4 at 125° C.) of about 20 to about 40, (b) an ethylene-propylene copolymer having a low melt flow rate and an Izod impact strength of about 9 ft.-lbs./in. or less, and (c) an effective amount of an organic peroxide, wherein the amount of the polymerized EPDM ranges from about 2 to about 10% by weight of the composition, the amount of ethylene-propylene copolymer ranges from about 90 to about 98% by weight of the composition, and wherein the organic peroxide is present in an amount effective to increase the melt flow and the impact strength of the ethylene-propylene copolymer, and wherein the reaction product has a no break Izod impact strength.

14. The composition of claim 13, wherein the organic peroxide is present in an amount of about 930 to about 1070 ppm.

15. The composition of claim 13, wherein the ethylene-propylene copolymer has a melt flow rate (Condition L) of about 0.1 to about 2.

16. The composition of claim 13, wherein the organic peroxide is present in an amount from about 100 ppm of the composition to about 0.5% by weight of the composition.

17. The composition of claim 13, wherein the polymerized EPDM has an ethylene content of about 70 to 75 wt. %.

18. A method of preparing a high melt flow, high impact strength thermoplastic polymeric composition according to claim 1 comprising the steps of:
(a) thoroughly mixing about 2 to about 10% by weight of a polymerized ethylene-propylene-diene monomer (EPDM), about 80 to about 98% by weight of an ethylene-propylene copolymer, and a catalytically effective amount of an organic peroxide; and
(b) extruding the mixture.

19. The method of claim 18, wherein the organic peroxide is present in an amount sufficient to increase the melt flow and impact strength of the ethylene-propylene copolymer.

20. The method of claim 19, wherein the mixing and extruding is carried out in a twin screw extruder having multiple heating zones.

21. The method of claim 20, wherein the multiple heating zones of the extruder are operated at a temperature of about 140° to about 220° C.

22. A method of preparing a high melt flow, high impact strength thermoplastic polymeric composition comprising reacting rom about 2 to about 10% by weight of a polymerized ethylene-propylene-diene monomer (EPDM) having a Mooney viscosity of about 20 to about 40 with about 90 to about 98% of an ethylene-propylene copolymer having a low melt flow rate and an Izod impact strength of about 9 ft.-lbs./in. or less in the presence of a catalytically effective amount of an organic peroxide, wherein the thermoplastic polymeric composition has a no-break Izod impact strength.

23. The method of claim 22, wherein the thermoplastic polymeric composition has the melt flow rate (Condition L) of about 7 to about 12.

24. The method of claim 22, wherein the ethylene-propylene copolymer has a melt flow rate of about 0.1-2.0 and an Izod impact strength of about 5 to about 9 ft.-lbs./in.

25. The method of claim 22, wherein the catalytically effective amount of the organic peroxide is from about 100 ppm of the composition to about 0.5% by weight of the composition.

26. The method of claim 22, wherein the polymerized EPDM an ethylene content of about 70 to 75 wt. %.

* * * * *